Feb. 19, 1952 W. B. BENNETT 2,586,604
FLEXIBLE COUPLING
Filed Dec. 19, 1949
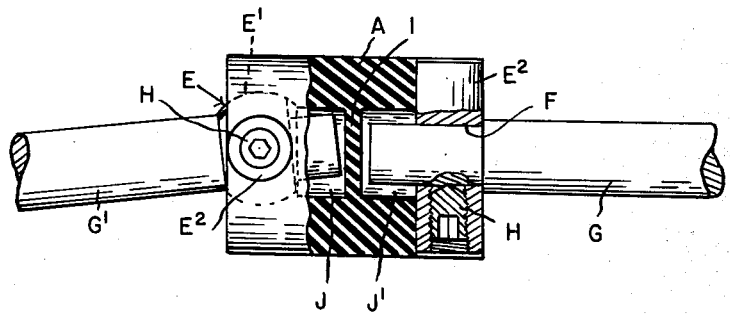
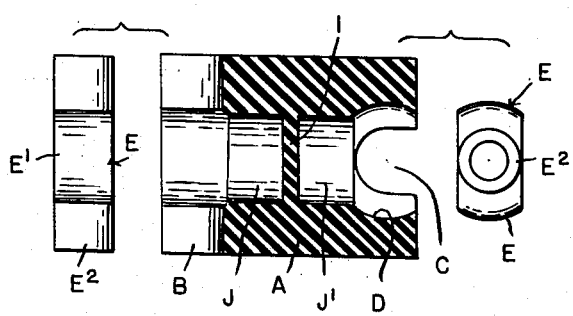
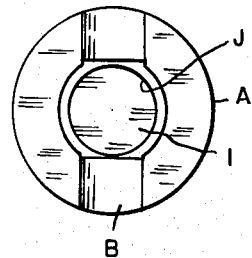
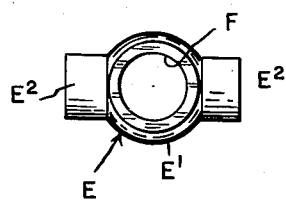
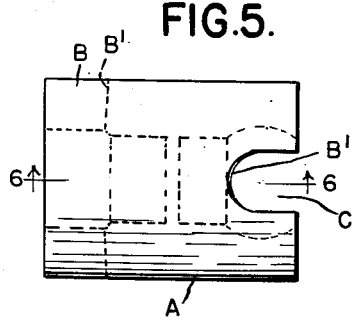
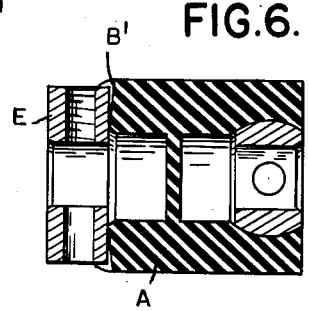
*INVENTOR.*
WESLEY B. BENNETT
BY
*Whittemore Hulbert + Belknap*
ATTORNEYS Patented Feb. 19, 1952

2,586,604

UNITED STATES PATENT OFFICE 2,586,604

FLEXIBLE COUPLING

Wesley B. Bennett, Detroit, Mich., assignor to Westward Washing Machine Company, Detroit, Mich., a corporation of Michigan Application December 19, 1949, Serial No. 133,893

6 Claims. (Cl. 64—11)

The invention relates to couplings more particularly designed for the connection of fractional horsepower electric motors with the mechanism to be operated thereby.

It is the object of the invention to obtain a construction which is sufficiently flexible to provide for slight misalignment in the driving and driven members. It is a further object to provide for a slight universal movement in the torque transmitting members.

With these and other advantageous features in view, the invention consists in the construction as hereinafter set forth.

In the drawings:

Fig. 1 is a side elevation partly in section of my improved coupling;

Fig. 2 is a longitudinal section through the body member showing the torque transmitting members detached therefrom;

Fig. 3 is an end elevation of Fig. 2;

Fig. 4 is an elevation of one of the torque transmitting members;

Fig. 5 is a side elevation of a slightly modified construction with the torque transmitting members removed; and Fig. 6 is a section on line 6—6, Fig. 5 with the torque transmitting members in engagement.

My improved coupling comprises a body member A formed of resilient, yieldable material such as natural or synthetic rubber. This material has preferably incorporated therein cotton linters, and is also preferably of an oil resisting nature. The body A is of a generally cylindrical shape having at opposite ends thereof cross channels B and C which are arranged at right angles to each other and are perpendicular to the longitudinal central axis of the body. The central portion D of each of these channels is of spherical form, while the portions on opposite sides thereof are substantially cylindrical. However, all of these portions of the channel are open through the end of the body for the insertion of torque transmitting members E therein. The members E have a central segmental spherical portion E' for fitting the spherical portion D of the channel being restricted in width in one dimension thereof, and on opposite sides of this central portion are cylindrical portions E² for fitting the cylindrical portion of the channel. The spherical portion E' has a bore F for receiving the end portion of a shaft member G or other rotary member. As shown, the shaft G is secured to the member E by a set screw H threadedly engaging an aperture in one of the cylindrical portions E². Thus if desired the coupling may be connected to the shaft after the members A and E have been assembled.

While the channels B and C are open through the ends of the member A, the central spherical portions of these channels are undercut so that the members E can only be engaged therewith when its restricted dimension is transverse to the channel. It is then turned through an angle of 90° into full engagement. When thus engaged the members E will be retained, but the body material is sufficiently yielding and resilient to permit of a limited relative movement. To impart greater flexibility, the body A is preferably hollow but is provided with an integral central disk partition portion I which forms a reinforcement. On opposite sides of this disk are chambers J and J' into which the ends of the shafts may project.

With the construction as described, the coupling may be used for connecting a motor, or other driving member, to the driven shaft of a machine such, for instance, as a washing machine. If the driven shaft G' is slightly out of alignment with the motor shaft G, the coupling will still be effective for it is in the nature of a universal joint. Thus each of the members E is free to oscillate about the axis of its cylindrical portions and is also capable of a limited movement in other directions due to the yielding resilient character of the body A. This body is, however, sufficiently rigid to transmit torque from one of the members E to the other.

It is sometimes desirable to electrically insulate the mechanism from its driving motor. This is accomplished by my improved coupling as the material of the body is dielectric.

In Figs. 5 and 6 a modified construction is illustrated in which the body member A has the end portions of the channels B and C thereof flared on their inner faces as indicated at B'. This will permit freer angular movement of the torque transmitting members E by reducing resistance to compressive stresses in said body. This construction is advantageous in that there is a considerable degree of rigidity in the resilient body member A so that the alternate compression and expansion thereof required when the axis of the shaft is at an angle to the axis of the body has a tendency to heat the latter. However, the flaring ends of the channel greatly reduce this heating effect.

What I claim as my invention is:

1. In a flexible torque transmitting coupling for rotary members, a body member formed of flexible resilient material having a cross channel in an end portion thereof opened through said end and also having centrally of said channel an undercut spherical recess, an insert of rigid material having oppositely extending end portions, and an integral central segmental spherical portion, the latter being restricted in width in one dimension thereof for insertion into said open channel being then turnable into engagement with said undercut spherical recess to be retained thereby from displacement, and a rotary member connected to said insert.

2. The construction as in claim 1 in which the insert has an axially extending recess in the segmental spherical portion thereof to receive a corresponding portion of said rotary member.

3. The construction as in claim 2 having a set screw engaging a threaded aperture in an end portion of said insert for securing said shaft thereto.

4. The construction as in claim 2 in which said body member has a cross channel in the opposite end portion thereof extending in a direction transverse to that of the aforesaid channel and having centrally thereof an undercut spherical recess, and a second insert the same in construction as the before mentioned insert engageable in the same way with said last mentioned channel.

5. The construction as in claim 4 in which said body member is hollow inwardly beyond said inserts to provide space for angular movement of said rotary members.

6. The construction as in claim 5 having an integral partition extending centrally across the hollow to reinforce the portions on opposite sides thereof.

WESLEY B. BENNETT.

REFERENCES CITED

The following references are of record in the file of this patent:

UNITED STATES PATENTS

| Number | Name | Date |
| --- | --- | --- |
| 1,732,354 | Cooper | Oct. 22, 1929 |
| 2,297,619 | Haberstump | Sept. 29, 1942 |
| 2,373,897 | Jones | Apr. 17, 1945 |

FOREIGN PATENTS

| Number | Country | Date |
| --- | --- | --- |
| 320,594 | Great Britain | Oct. 17, 1929 |